Patented Oct. 22, 1935

2,018,492

UNITED STATES PATENT OFFICE 2,018,492

PLASTIC COMPOSITION AND METHOD OF MAKING THE SAME

Herman L. Grupe, Scotia, and Roy H. Kienle, Schenectady, N. Y., assignors to General Electric Company, a corporation of New York No Drawing. Application October 27, 1931, Serial No. 571,454

9 Claims. (Cl. 134—17)

The present invention relates to plastic compositions and more particularly to a rubber-resin composition which is relatively unaffected by mineral oils and hydrocarbons and which is water, alkali and acid proof, and to methods of making the same.

Rubber is known to be a desirable material for many applications where flexibility and elasticity as well as insulation is required. Due to these qualities it has been employed in various electrical apparatus but a chief objection has been its attack by mineral oils commonly employed in such apparatus. When in contact with mineral oils, or with such hydrocarbons as naphtha, gasoline and the like, the rubber swells and distorts very easily due to attack by these chemical agents.

It has been proposed to incorporate with the rubber such resins as those of the phenolic type in order to increase the insulation characteristics and in some cases the acid and alkaline resisting qualities of the rubber. However, as far as we are aware such resins have not materially enhanced the life of the rubber in the presence of mineral oils and hydrocarbons, such as gasoline and naphtha. Nor has it been possible, as far as we are aware, to retain or increase the flexibility of the rubber by the use of such resins as those of the phenolic type.

We have discovered that by properly compounding rubber and a resin of the alkyd type we are enabled to produce a product which is oil and gasoline proof and which can be made in various degrees of flexibility.

Our invention will be best understood by referring to the following detailed description thereof and its scope will be pointed out in the appended claims.

Alkyd resins, as is known, include all those complexes resulting primarily from the reaction of a polyhydric alcohol, such as glycerine, and a polybasic acid, such as phthalic acid or its anhydride, with or without other reacting ingredients.

In accordance with one method of carrying out our invention an alkaline solution of an alkyd resin is prepared by heating, for example, 50 parts by weight of a glycerol-phthalate resin with 250 parts by volume of a 5% ammonia solution. Equal parts by weight of this solution and concentrated rubber latex, for example the material known as Revertex are thoroughly mixed, and to the mixture is added a 5% solution of an acid, for example acetic acid. The precipitate is washed thoroughly with water to remove the excess acid and acetates formed in the reaction and is dried at a temperature between 75°-85° C. It is then mixed on a rubber mill according to usual practice, with sulphur or other vulcanizing agent, accelerator and such fillers as desired. A suitable mixture, for example, is the following:

| | Parts by weight |
|---|---|
| Rubber-alkyd resin composition | 200 |
| Sulphur | 3 |
| Accelerator (Captax) | 2 |
| Zinc oxide | 50 |

The composition is vulcanized or cured in the regular way. A satisfactory cure is obtained when the composition is treated for example at approximately 140° C. for a period of about 3 hours.

Instead of using a straight alkyd resin, we may use a resin of the type modified during its preparation with fatty acids derived from vegetable oils, such as the drying oils, and/or the oils themselves. For example, an alkyd resin prepared from glycerine, phthalic anhydride and linseed oil fatty acids was employed by dissolving it in an ammoniacal solution and compounding it with latex as in the previous case. A vulcanized composition was produced using the following ingredients and proportions:

| | Parts by weight |
|---|---|
| Rubber—fatty acid alkyd resin composition | 200 |
| Sulphur | 6 |
| Accelerator (Captax) | 1.5 |
| Zinc oxide | 10.0 |
| Clay | 100.0 |

A 3-hour cure at about 140° C. was employed.

Tests on compositions such as those prepared as described above showed that both the swelling and lateral expansion of the composition in both 10—C transformer oil and 55° naphtha was reduced approximately 50% as compared to straight rubber composition prepared from the same ingredients without the resin.

If the flexibility of the composition is to be improved or increased above that of ordinary rubber, an alkyd resin of the flexible type may be employed. Such resins, briefly, are prepared by reacting with the polyhydric alcohol and polybasic acid ordinarily employed in the preparation of an alkyd resin, suitable quantities of dihydric alcohol, for example, ethylene glycol, and dibasic aliphatic acid, for example, succinic acid or adipic acid. The preparation of such resins is more fully described in the copending application of Kienle and Rohlfs Serial No. 393,119, filed Sept. 16, 1929 and assigned to the assignee of the present invention.

As an example of the preparation of such a rubber-resin composition the following is given:

A resin is prepared by heating

| | Parts by weight |
|---|---|
| Glycerine | 92 |
| Phthalic anhydride | 222 |
| Ethylene glycol | 93 |
| Adipic acid | 219 | at the proper temperature to the requisite end point. For example, the ingredients are cooked at 190° C. to a 20 second cure on a 200° C. hot plate. This resin is a flexible type of alkyd resin in which the mol ratio of glycerol phthalate to glycol adipate is 1:3.

50 parts by weight of this resin is dissolved in ammonia water and mixed with 200 parts by weight of rubber gum in the form of latex. The mixture is diluted with 2% ammonia water then precipitated with a solution of 5% acetic acid. The precipitate is thoroughly washed with water and dried for 12 to 14 hours at 90° C. The dried resin-rubber mixture then is used to make the following compound

| | Parts by weight |
|---|---|
| Resin-rubber mixture | 200.0 |
| Zinc oxide | 10.0 |
| Sulphur | 10.0 |
| Captax (accelerator) | 2.5 |
| Stearic acid | 2.0 |

The compound is mixed on a rubber mill according to usual rubber compounding practice and then cured in a press at 135° C. for 15 minutes.

In order to illustrate the invention further the following additional examples are given showing how the resin may be varied in making the rubber-resin composition.

A—A resin was prepared by cooking

| | Parts by weight |
|---|---|
| Glycerine | 92 |
| Adipic acid | 219 | at 190° C. to a 12 second cure on a 200° C. hot plate.

B—A resin was prepared by cooking

| | Parts by weight |
|---|---|
| Linseed oil acids | 140 |
| Glycerine | 101 |
| Succinic acid | 166 | at 190° C. to a 15 second cure on a 200° C. hot plate.

C—A resin was prepared by cooking

| | Parts by weight |
|---|---|
| Phthalic anhydride | 444 |
| Ethylene glycol | 186 | at 190° C. until the mass was hard and brittle at room temperature.

Ammoniacal solutions or suspensions were made with each of these resins by treating 50 parts by weight of the resin with ammonia water. Each of the solutions or suspensions was then mixed with rubber latex using a ratio of 200 parts by weight of rubber gum to 50 parts by weight of resin. The mixtures were each diluted with 2% ammonia water then precipitated with a solution of 5% acetic acid. The precipitate was then thoroughly washed with water and dried at 90° C. for 12-14 hours. The dried resin-rubber mixture was compounded on a rubber mill prior to vulcanization using the following ingredients:

| 1. | Parts by weight |
|---|---|
| Resin A—rubber mixture | 200.0 |
| Zinc oxide | 10.0 |
| Sulphur | 10.0 |
| Captax | 2.5 |
| Stearic acid | 2.0 |

| 2. | Parts by weight |
|---|---|
| Resin B—rubber mixture | 200.0 |
| Zinc oxide | 10.0 |
| P—33 thermotomic carbon | 400.0 |
| Sulphur | 10.0 |
| Captax | 2.5 |
| Stearic acid | 2.0 |

| 3. | Parts by weight |
|---|---|
| Resin C—rubber mixture | 200.0 |
| Zinc oxide | 10.0 |
| Sulphur | 10.0 |
| Captax | 2.5 |
| Stearic acid | 2.0 |

Thermotomic carbon was added in 2 to facilitate handling.

Each of the above compounds were cured in a press 15 minutes at 135° C.

By means of our invention there results a resin-rubber mixture wherein each rubber particle is in intimate association with a film of alkyd resin. Thus the rubber is carefully protected from attack by oils and hydrocarbons such as naphtha and gasoline by a thin film of alkyd resin. At the same time no material reduction in resiliency or other desirable physical properties of the rubber is effected. On the contrary the resiliency and elasticity of the rubber is maintained and in some cases enhanced especially where the thin film of alkyd resin protecting the individual particles of rubber is of the flexible type.

It is not necessary to employ a solution of the resin in making the rubber-resin composition. An emulsion of the resin may be used. For example, an emulsion may be made by emulsifying a mixture comprising 10 parts by weight of casein glue, 30 parts by weight of water and 150 parts by weight of an alkyd resin containing 13% by weight of linseed oil fatty acids and containing also 13% by weight of linseed oil. A mixture of approximately equal parts by weight of this emulsion and a suspension of rubber latex containing the following is made:

| | Parts by weight |
|---|---|
| Latex | 120 |
| China clay | 30 |
| Sulphur | 5 |
| Accelerator | 1 |
| Water | 150 |

Two pieces of aeroplane cloth were impregnated with this mixture, dried at room temperature and vulcanized together for 30 minutes at 160° C. in a vulcanizing press. The resulting piece of laminated material was pliable and withstood the action of mineral oil, fuel oil and a mixture of 68° naphtha and benzol, being only slightly affected after being submerged in the 68° naphtha-benzol for 72 hours.

Instead of employing the rubber in the form of latex it may be employed in the form of a dispersion. That is the rubber gum, unvulcanized, may be compounded with vulcanizing agent, accelerator and such fillers as desired and then compounded with an alkyd resin either in the form of an ammoniacal or basic solution or an emulsion.

It is apparent that the various examples given above are merely illustrative of the invention. Within the scope of the invention are included various obvious modifications. It is to be understood that any suitable type of alkyd resin may be employed in carrying out the invention.

The rubber-alkyd resin composition may be employed in connection with various fillers, dyes, pigments and the like and may be used either in suspension, solution or solid form to make various articles of manufacture such as gaskets, oil-proof cloth, gasoline gauge diaphragms, wire coatings and other materials which must be flexible, elastic or pliable and resistant to mineral oils and hydrocarbons.

It is of course understood that in the curing operation, the alkyd resin where it is of the heat convertible type converts to the infusible, insoluble state. Where, as in the case of glycol phthalate, heretofore described, the resin is of the non-heat convertible type, the latter apparently becomes an integral part of the vulcanized rubber.

What we claim as new and desire to secure by Letters Patent of the United States, is:

1. A composition comprising an intimate mixture of discrete particles of vulcanized rubber and surface-coated with a flexible alkyd resin.

2. A composition comprising an intimate mixture of discrete particles of rubber surface-coated with a resin of the alkyd type.

3. An article of manufacture comprising an oil resistant alkyd resin-rubber composition, said composition comprising vulcanized rubber particles surface-coated with a film of alkyd resin.

4. The method of making an oil and gasoline resistant composition which comprises surface coating vulcanizable rubber particles with a film of resin of the alkyd type, adding vulcanizing agent, accelerator and filler and curing the entire mixture.

5. The method of making an oil and gasoline resistant composition which comprises preparing a basic solution of resin of the alkyd type, preparing a mixture of said solution and rubber latex, treating said mixture with acid, washing and drying the precipitate formed, compounding said precipitate with vulcanizing agent, accelerator and filler, and curing the entire mass.

6. The method of making a vulcanizable composition capable of being cured to produce an oil and gasoline resistant product, which comprises preparing an emulsion of an alkyd resin, and compounding said emulsion with rubber latex containing mixed therewith vulcanizing agent, accelerator and filler.

7. An oil and gasoline resistant composition comprising an intimate mixture of discrete particles of rubber surface-coated with flexible alkyd resin which is the product of reaction of a polyhydric alcohol, a polybasic acid, a dihydric alcohol and a dibasic aliphatic acid.

8. A composition of matter comprising an intimate mixture of rubber latex and an aqueous dispersion of an alkyd resin.

9. A composition of matter comprising an intimate mixture of rubber latex and an aqueous alkaline solution of an alkyd resin.

HERMAN L. GRUPE.
ROY H. KIENLE.